R. A. ADAMS.
Graining Machine.
No. 233,179.  Patented Oct. 12, 1880.
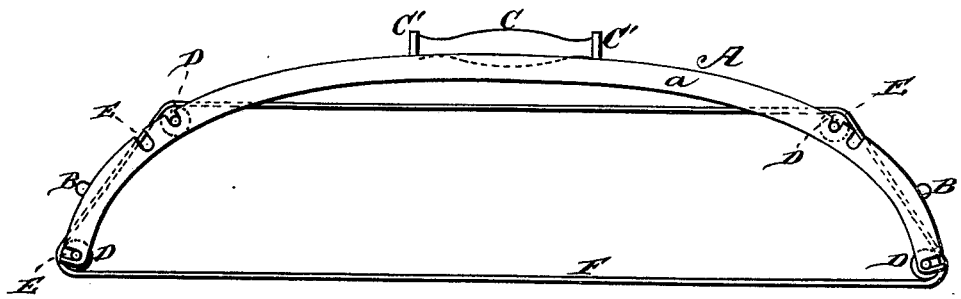
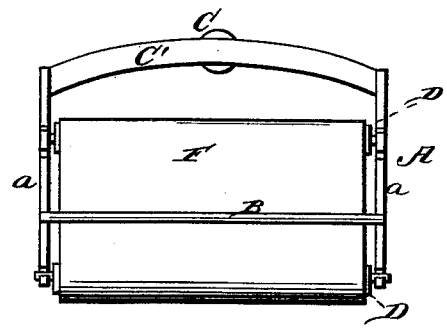
WITNESSES
Robert Everett
Chas. G. Page.
INVENTOR
Robert A. Adams
Gilmore, Smith & Co.,
ATTORNEYS

UNITED STATES PATENT OFFICE.

ROBERT A. ADAMS, OF GRAND RAPIDS, MICHIGAN.

GRAINING-MACHINE.

SPECIFICATION forming part of Letters Patent No. 233,179, dated October 12, 1880.

Application filed January 3, 1880.

*To all whom it may concern:*

Be it known that I, ROBERT A. ADAMS, of Grand Rapids, in the county of Kent and State of Michigan, have invented certain new and useful Improvements in Graining-Machines; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my graining-machine, and Fig. 2 is an end view of the same.

My invention relates to that class of graining-machines in which an endless belt provided on its outer surface with lines in imitation of veneers of wood is mounted on adjustable rollers in a suitable frame in such a manner that the imprint upon the endless belt may be transferred to the surface to be grained by coating the outer surface of the endless belt with the desired oil-color and passing the machine over the work; and it consists in the improvements in the construction of the same hereinafter fully described, and particularly pointed out in the claim.

In the drawings, A designates a holder composed of two curved pieces, a a, of steel or other suitable material, connected together by means of brace-rods B B. This holder is provided with a handle, C, which is fastened to the cross-bars, C', which also serve to connect the curved sides a together.

D designates rollers of any suitable hard or flexible material, these rollers being journaled in notches E formed in the sides a a.

F designates an endless belt or plate, which is stretched over these rollers, as shown, the ends of the belt being joined together in any proper manner, so as to leave an unbroken surface to the belt. This belt or plate is elastic or flexible, and is composed of a compound described in Letters Patent No. 151,337, granted to me May 26, 1874. I adjust the tension of said endless belt or plate by placing the rollers in different notches which are formed in the sides of the holder, as before described.

By the employment of the notches and the rollers D, I dispense with the use of slots and set-screws for regulating the tension of the endless plate or belt. Set-screws require more time and labor in their construction than do the rollers D, and besides, they are liable to be covered with paint, which renders them nearly, if not entirely, inoperative until cleaned. The rollers D are cheaper and far more readily adjusted to regulate the tension of the belt, which may be accomplished by simply changing the rollers from one set of notches in the curved sides to another set.

To apply the elastic endless belt or plate to the work which I wish to paint or decorate I ink the face of the belt with a suitable roller, using an oil-color paint. When the color is properly distributed I place the end of the holder against the end of the surface to be painted or decorated, and then pass the holder slowly along said surface, allowing the belt to travel on the rollers, thus transferring the exact impression of its lines to the work; or I place the face of the belt to the surface to be painted or decorated and then rub with the hand or a soft pad lightly over the back of the belt, which will produce the same result as the moving of the belt over the rollers, as hereinbefore described. By this method all the fine lines and fibers of the natural wood can be transferred to cheap wood, dispensing with the tedious and expensive process of veneering.

The belt or plate, when not in use, should be thoroughly cleaned with turpentine, benzine, or the like.

Having thus described my improvement, what I claim, and desire to secure by Letters Patent, is—

In a graining-machine, the combination of the holder A, composed of the notched and curved side pieces, a E, handle C, and brace-rods B, with the rollers D and endless belt or plate F, substantially as and for the purposes set forth.

In testimony that I claim the above I have hereunto subscribed my name in the presence of two witnesses.

ROBERT A. ADAMS.

Witnesses:
L. S. PROVIN,
N. L. GULLUP.